March 14, 1967  D. O. NOORLANDER  3,308,788
TEAT CUP ASSEMBLY
Filed Sept. 23, 1965  5 Sheets-Sheet 1

INVENTOR.
DANIEL O. NOORLANDER
BY Joseph G. Werner
ATTORNEY

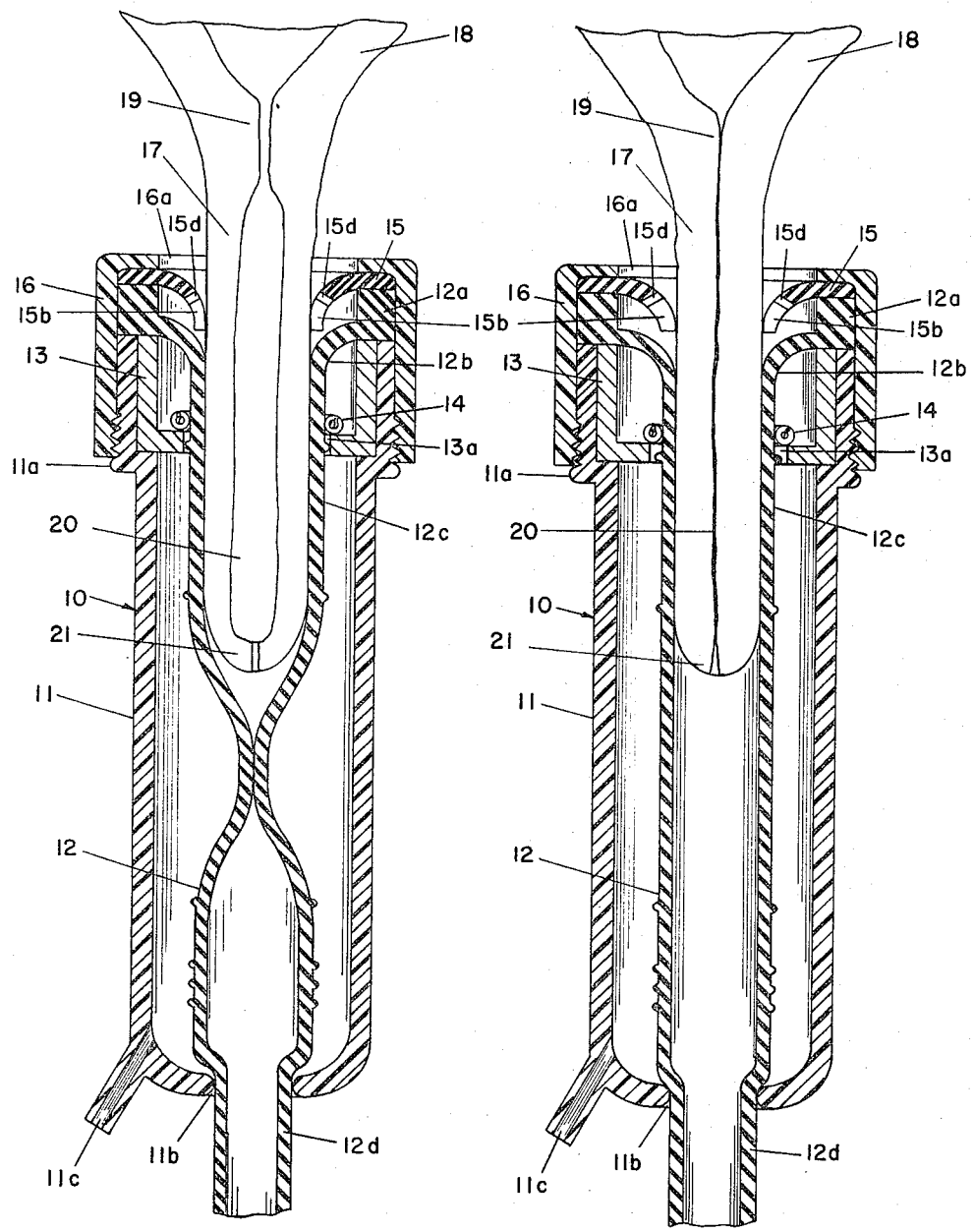

March 14, 1967 D. O. NOORLANDER 3,308,788
TEAT CUP ASSEMBLY
Filed Sept. 23, 1965 5 Sheets-Sheet 3

INVENTOR.
DANIEL O. NOORLANDER
BY Joseph L. Werner
ATTORNEY

March 14, 1967 D. O. NOORLANDER 3,308,788
TEAT CUP ASSEMBLY
Filed Sept. 23, 1965 5 Sheets-Sheet 4

INVENTOR.
DANIEL O. NOORLANDER
BY
Joseph L. Werner
ATTORNEY

March 14, 1967 D. O. NOORLANDER 3,308,788
TEAT CUP ASSEMBLY
Filed Sept. 23, 1965
5 Sheets-Sheet 5
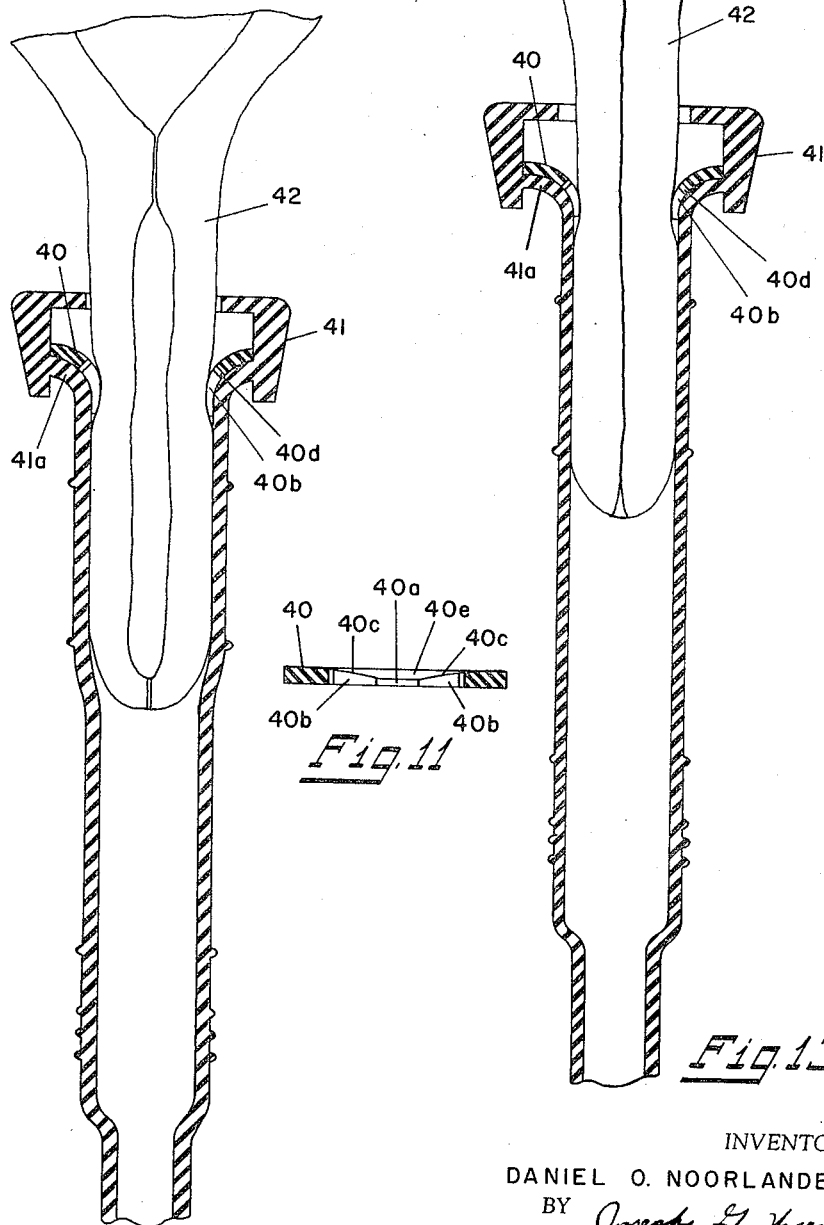
INVENTOR.
DANIEL O. NOORLANDER
BY Joseph L. Werner
ATTORNEY United States Patent Office 3,308,788
Patented Mar. 14, 1967

3,308,788
TEAT CUP ASSEMBLY
Daniel C. Noorlander, Madison, Wis., assignor to Bel-Mar Manufacturing Corporation, McFarland, Wis., a corporation of Wisconsin
Filed Sept. 23, 1965, Ser. No. 489,667
3 Claims. (Cl. 119—14.52)

This invention relates generally to milking machines and more particularly to improvements in teat cup assemblies for milking machines for providing improved milking and preventing mastitis.

Milking machines work on the principle of pressure differentials. That is, the pressure at the end of the teat of the cow is reduced so that the higher milk pressure in the teat cistern overcomes the resistance of the sphincter and allows the milk to flow therethrough. The milking machines are provided with a pulsating vacuum line and a vacuum milking line for drawing milk from the teat. The pulsator causes air to pass into and out of the chamber between the shell of the teat cup assembly and the flexible liner according to the phase of the pulsation. Vacuum is continuously applied inside liner of the teat cup assembly and, thus, to the end of the teat, but when the pulsator allows air to enter the chamber between the liner and the shell, the liner collapses below the end of the teat and, for a brief period, seals the end of the teat from the vacuum which is being continuously applied through the milking line. This is called the "resting phase." During this phase blood is allowed to return to the upper portions of the teat after being drawn to the end of the teat by the vacuum applied through the milking line. When the pulsator causes the air in the chamber betwen the shell and the liner to be pumped out, thus, substantially equalizing the pressure on the inside and the outside of the liner, the liner opens and milking resumes. This is called the "milking phase."

If the liner does not collapse completely during the "resting phase," or does not collapse for a sufficient duration, congestion and damage will occur to the teat end because the vacuum will then be constantly applied to the teat and there is in effect, little or no "resting phase."

The liner may not collapse properly for several reasons, such as, if the pulsator does not permit enough air to enter the chamber between the liner and the shell, or if the pressure within the liner is not sufficiently reduced to permit the atmospheric pressure to collapse the liner. If the bore of the liner is so large that the liner fits too loosely it will crawl up the teat and crowd the base of the udder, thus, allowing the teat to seat too deeply in the liner which will prevent the liner from collapsing below the teat. Furthermore, these large bore liners which crowd against the base of the udder cause a constriction around the top of the teat which further restricts the flow of milk from the udder through the top of the teat which is already anatomically restricted by tissue thickening and the annular folds at the base of the udder. For this reason it is important that the teat cup assembly remain well below the base of the udder. Smaller bore liners which fit tighter on the teat than larger bore liners have less tendency to crawl up the teat and crowd against the base of the udder.

One of the major causes of mastitis in cows arises when air or milk which is contaminated with bacteria, are allowed to back up into the teat cistern. This will happen if a negative pressure, that is, a pressure less than atmospheric, is allowed to form in the teat cistern after the end point of milking, or in other words, after all the milk has been emptied from the udder. It has been recognized that if, at the end point of milking, air under atmospheric pressure is admitted into the mouth portion of the liner and down the sides of the teat, the teat wall will be collapsed, thus, preventing contaminated air or milk from being drawn into the teat cistern by a vacuum in the cistern.

In the past, teat cup assemblies which have been designed to admit air into the liner have proved unsuccessful in that it was found that they dropped off the teat when the teat wall collapsed at the end point of milking. The reason for the drop-off problem was that there was no vacuum seal at the mouth portion of the liner, as had been provided in the past, and therefore, when the teat wall collapsed and became smaller than the bore of the liner air bypassed the teat and the liner dropped off. In view of this, liners presently on the market have a rather stiff mouth portion which forms an air-tight or vacuum seal with the teat to prevent the liner from dropping off the teat. However, the use of these liners which do not allow air to enter the mouth of the liner, is a major cause of mastitis because the air-tight seal at the mouth portion prevents the teat from collapsing at the end point of milking as discussed above. The air-tight sealing mouth portions of the known liners also restrict the flow of blood in the teat tissue.

Accordingly, an object of my invention is to provide a new teat cup assembly which will permit the teat wall to collapse at the end point of milking so that a negative pressure will not build up inside the teat cistern and which will not drop off the teat.

Another object of my invention is to provide a teat cup assembly which provides a vacuum seal on the teat wall during full milk flow but which allows the introduction of air under atmospheric pressure down the sides of the teat wall at the end point of milking to collapse the teat wall for preventing contaminated air or milk from being drawn up into the teat cistern and which provides mechanical means to prevent the teat cup assembly from dropping off the teat at the end point of milking.

Another object of my invention is to provide a teat cup assembly having a transparent plastic shell to permit visual inspection of the pulsating liner during operation.

Another object of my invention is to provide a teat cup assembly having a plastic shell which is weighted to prevent excessive crawl on the teat, to provide tensioning of the teat to open the annular folds at the base of the udder to allow easy passage of milk from the udder into the teat cistern, and to cause the vacuum milking line to be closed by causing it to fold over when the teat cup assembly is removed from the teat.

Another object of my invention is to provide a teat cup assembly having a metal spring encircling the neck portion of the liner so that substantially the same resiliency and diameter will be maintained in the neck portion of the liner for its full life for preventing teat-crawl which would otherwise take place as the liner loses its resiliency due to fatigue and absorption of butterfat over a period of time.

Still another object of my invention is to provide a resilient disk for preventing teat cup drop-off which is separate from the body of the liner of the teat cup assembly so that different materials having special characteristics can be utilized for the disk and for the liner and to facilitate the cleaning and inspection of the teat cup assembly.

A still further object of my invention is to provide a resilient disk for preventing teat cup drop-off which can be used in connection with standard teat cup assemblies.

Other objects, features and advantages of my invention will be apparent from the following detailed description taken in conjunction with the accompanying drawings showing several embodiments exemplifying the principles of my invention.

In the drawings:

FIG. 4 is a cross-sectional view of the teat cup assembly shown in FIG. 2 positioned on the teat of a cow during the "resting phase."

FIG. 5 is a cross-sectional view of the teat cup assembly of FIG. 2 positioned on the collapsed teat of a cow at the end point of milking.

FIG. 10 is a plan view of another modified form of a resilient disk for my teat cup assembly.

FIG. 11 is a cross-sectional view taken along line 11—11 of FIG. 10.

FIG. 12 is a cross-sectional view through a standard teat cup liner with the disk of FIG. 10 therein and positioned on the teat of a cow during the "milking phase."

FIG. 13 is a cross-sectional view through a standard teat cup disk with the disk of FIG. 10 therein and positioned on the collapsed teat of a cow at the end point of milking.

Figures 1, 2, 3:
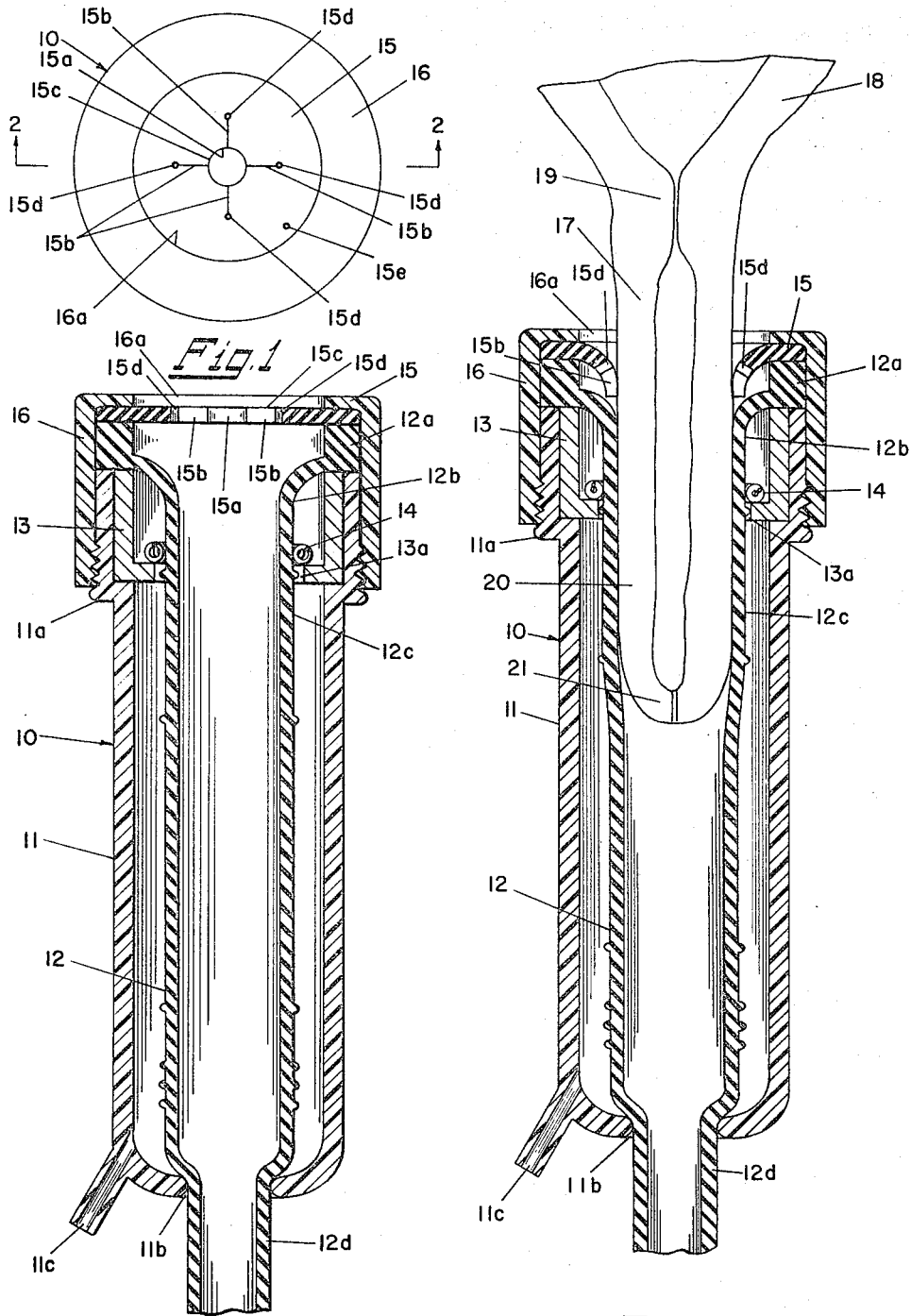
FIG. 1 is a top view of a preferred embodiment of my teat cup assembly.
FIG. 2 is a cross-sectional view taken along line 2—2 of FIG. 1 showing a preferred form of my teat cup assembly.
FIG. 3 is a cross-sectional view showing the teat cup assembly of FIG. 2 positioned on the teat of a cow during the "milking phase."

Referring now more particularly to the drawings wherein like numerals designate like parts throughout the several views, in FIGS. 1 and 2 my new teat cup assembly is generally designated at 10 and has a substantially rigid outer tubular shell 11 and a resilient liner 12 therein. Shell 11 has a threaded, open-topped head portion 11a at its upper end and an aperture 11b at its bottom end through which the liner 12 extends. Adjacent aperture 11b is a port 11c which is adapted to be connected to the pulsating vacuum line of a milking machine (not shown) for alternately subjecting the chamber between shell 11 and liner 12 to vacuum and air pressure during the milking operation.

Shell 11 is preferably made of clear plastic for allowing visual inspection of the pulsating liner during milking so that any malfunction in the pulsating portion of the milking machine can be quickly ascertained.

Liner 12 has an enlarged mouth portion 12a and a neck portion 12b which tapers downwardly into upper body portion 12c which in turn tapers downwardly into a lower portion 12d which is adapted to be connected to the vacuum milking line of a milking machine. The mouth portion 12a engages the upper edge of the head portion 11a of shell 11 and the upper edge of a metal ring 13 seated in head portion 11a.

The liner 12 may be made of soft, resilient material such as, for example, natural gum rubber or poly-vinyl chloride. Poly-vinyl chloride has the advantage that it has less tendency to absorb butterfat than natural gum rubber. The absorption of butterfat over a period of time causes natural gum rubber to stretch and lose some of its resiliency.

The ring 13 has a hole 13a therethrough which is somewhat larger than the upper body portion 12c of liner 12. The ring shown at 13 is made of lead and provides the weight necessary for the proper functioning of the teat cup assembly. The weight of the assembly is important for several reasons. Firstly, it helps to prevent the assembly from crawling up the teat to a position where it crowds against the base of the udder of the cow. Secondly, the teat cup assembly should have sufficient weight so that when it is hung on the teat 17 of a cow as shown in FIG. 3, it will tension and stretch the teat in order to open the annular folds 19 at the base of the udder 18 to allow easy passage of milk from the udder into the teat cistern 20. Thirdly, the teat cup assembly should have enough weight so that when the assembly is removed from the teat after the end point of milking, the teat cup assembly will cause the milking line of the milking machine to be folded over on itself to close off the line so that air and foreign matter will not be sucked into it.

The weight of the lead ring 13 shown is about five and one-half ounces and the total weight of teat cup assembly 10 is about twelve ounces; however, it is understood that the weight of the assembly may vary substantially to accommodate use with various milking machines and facilitate the milking of cows of a variety of ages and sizes.

As seen in FIGS. 2 and 3, the size of hole 13a in ring 13 is such that it will engage the upper wall portion 12c of liner 12 when the teat of a cow to be milked is inserted into the liner. The ring 13 prevents the upper wall portion 12c of the liner from expanding beyond the diameter of its maximum efficiency.

A helical metal spring 14 encircles the neck portion 12b of liner 12. Rubber liners tend to stretch lengthwise, expand in diameter and lose some of their resiliency due to absorption of butterfat and fatigue over a period of time. Thus, due to their expanded diameter, known teat cup assemblies that have been used for some period of time tend to crawl up the teat and crowd against the base of the udder. The metal spring 14 insures that substantially the same bore diameter and resiliency will be maintained in the neck portion of the liner for its full working life.

A resilient disk 15 is positioned on the mouth portion 12a of liner 12. As best seen in FIGS. 1 and 2, disk 15 has a centrally located circular aperture 15a which is substantially smaller than the bore of liner 12. A plurality of slits 15b extend radially outward from aperture 15a. The slits 15b form inwardly directed fingers 15c therebetween, for grasping the teat wall as shown in FIGS. 3–5. The slits 15b also admit air under atmospheric pressure into the mouth portion 12a of liner 12. As best seen in FIG. 1, enlarged air inlets 15d are provided at the outer extremities of slits 15b.

An orifice 15e may be provided in disk 15 outwardly of the air inlets 15d to insure admittance of air into the mouth portion 12a of liner 12 when the teat cup assembly 10 is used on large teated cows.

Figure 7:
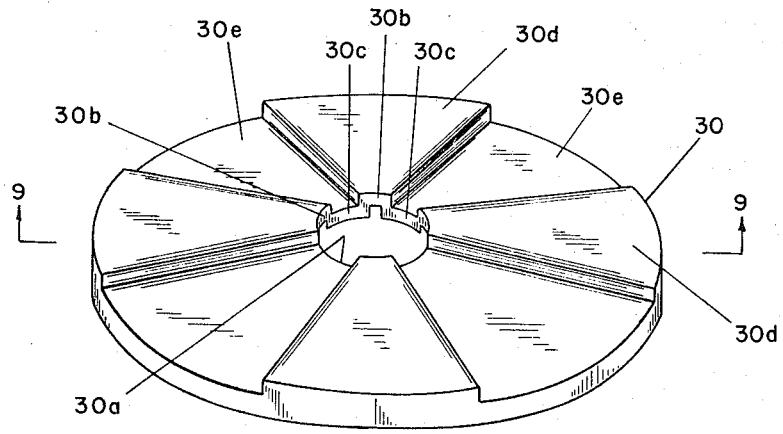
FIG. 7 is a perspective view of a modified form of a resilient disk for my teat cup assembly.
Figure 8:
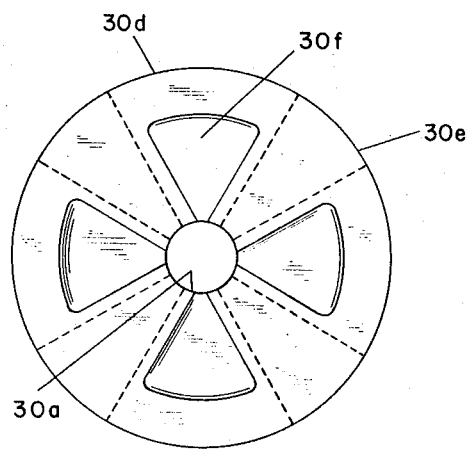
FIG. 8 is a bottom view of the disk of FIG. 7.
Figure 9:
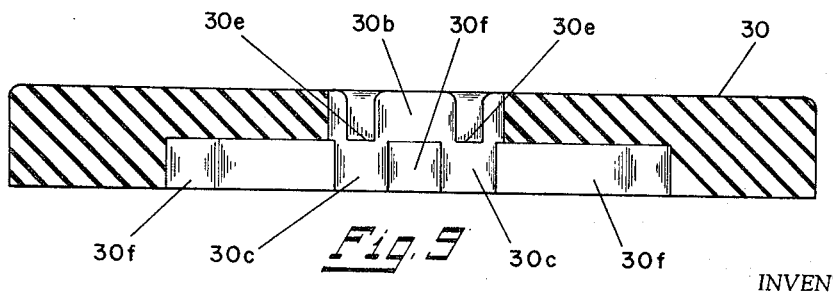
FIG. 9 is a cross-sectional view taken along line 9—9 of FIG. 7.

A modified form of a disk is shown at 30 in FIGS. 7–9. Disk 30 has a centrally located circular aperture 30a which is somewhat smaller than the teat of a cow. Aperture 30a is defined by upper and lower edge portions 30b and 30c, respectively. Upper edge portions 30b connect to raised, substantially triangular portions 30d having lower channel sections 30e therebetween. Raised portions 30d have recessed pockets 30f therein.

When a teat cup assembly having disk 30 therein is hung on the teat of a cow the disk 30 will be flexed downwardly by the insertion of the teat in the same manner as disk 15. When flexed downwardly the upper edge portions 30b grip the teat wall while the lower edge portions are pulled away from the teat wall to admit air into the mouth of the liner through channel sections 30e.

Another modified form of a disk is shown at 40 in FIGS. 10–13. Disk 40 is particularly well suited for use in conventional teat cup liners, such as 41 shown in FIGS. 12 and 13. Like disk 15, disk 40 has a centrally located circular aperture 40a which is substantially smaller than the bore of liner 41 and it has a plurality of slits 40b extending radially outward from aperture 40a. The slits 40b form inwardly directed fingers 40c therebetween. Slits 40b may have enlarged air inlets 40d at their outer ends. As best seen in FIGS. 10 and 11, disk 40 differs from disk 15 in that disk 40 has a circular, tapered inner portion 40e. Thus, at best seen in FIG. 11 the fingers 40c have a substantially thinner cross-section at their inner ends than at their outer ends.

As illustrated in FIG. 12, when the disk 40 is placed in the standard liner 41 the disk rests on the top of neck portion 41a, whereas, in the teat cup assembly shown in FIG. 2, the disk 15 is positioned on top of the mouth portion 12a of liner 12. When the full teat 42 of a cow to be milked is inserted into the standard liner 41 with disk 40 therein, the inner portion of disk 40 is flexed downwardly flush against the curved neck portion 41a of the liner 41.

Air will be admitted down the sides of the teat 42 through inlets 40d and slits 40b to collapse the teat at the end point of milking to prevent contamination of the teat cistern.

As in FIG. 13 the holding action of disk 40 when used in a standard liner such as 41 is somewhat different than that of disk 15 and 30 in that the downwardly flexed disk 40 restricts the neck portion of the liner somewhat and holds the liner on the collapsed teat at the in point of milking.

It is understood that disk 40 could be used in connection with the teat cup assemblies shown in FIGS. 2–6 in place of disks 15 and 30.

The disks 15, 30 and 40 are preferably made of polyvinyl chloride or neoprene which have the desired resiliency and which are highly resistant to butterfat and, therefore, unlike natural gum rubber, will not lose their resiliency due to absorption of butterfat. The disks 15, 30 and 40 are all designed so that they may also be used in connection with standard teat cup assemblies.

In my novel teat cup assembly 10 a plastic cap 16 is threaded onto the head portion 11a of shell 11. The cap 16 has a hole 16a therein to facilitate the positioning of the teat cup assembly on the teat of a cow.

FIGS. 3–5 show teat cup assembly 10 with disk 15 therein in three phases of operation on the teat 17 of a cow. The teat 17 depends from the udder 18 of a cow as shown. There are annular folds 19 at the base of the udder 18 through which the milk passes into the teat cistern 20 which is constricted at its lower end by the sphincter 21. It should be noted that for proper milking, the teat cup assembly is positioned well below the base of the udder 18 so as not to constrict the annular folds 19 at the base of the udder.

FIG. 3 shows the operation of teat cup assembly 10 during the "milking phase." During this phase, vacuum is continuously applied to the inside of liner 12 and, thus, to the end of the teat 17. The wall of liner 12 forms a substantially air-tight seal with the teat wall. The pulsator of the milking machine applies vacuum in the chamber between the shell 11 and liner 12 and substantially equalizes the negative pressures on the inside and outside of the liner 12. Thus, the liner 12 is open and the higher milk pressure within the teat cistern 20 overcomes the resistance of sphincter 21 and allows milk to flow therethrough into the milking line of the milking machine.

FIG. 4 shows the operation of teat cup assembly 10 during the "resting phase." During this phase, vacuum is still continuously applied through the vacuum milking line which is attached to the lower portion 12d of liner 12 and the liner 12 still forms an air-tight seal with the teat wall. However, during this phase, the pulsator allows air to enter the chamber between the liner 12 and the shell 11 which causes the liner 12 to collapse below the end of teat 17 to seal the end of the teat from the vacuum being continuously applied through the milking line. It will be noted that during both the "milking phase" and the "resting phase" air is admitted into the mouth portion 12a of liner 12 through slits 15b and inlets 15d in disk 15. The teat wall does not collapse however, due to the milk pressure in the teat cistern.

The "milking phase" and the "resting phase" are alternated according to the rate of pulsation of the milking machine until the end point of milking, that is, until the udder and teats have been emptied of their milk.

At the end point of milking, the teat wall collapses, as shown in FIG. 5, due to the pressure differential resulting from the air under atmospheric pressure being admitted into the liner 12 through slits 15b and air inlets 15d and the vacuum applied to the teat end by the vacuum milking line of the milking machine. The collapsing of the teat wall prevents a negative pressure or vacuum from building up in the teat cistern 20 when the milk pressure drops. That is, the pressure inside the teat is not allowed to drop below the pressure outside the teat so that no contaminated air or milk can be pushed back up into the cistern 20. It is apparent that a major cause of mastitis is thus eliminated by use of my new teat cup assembly. It is further apparent that my teat cup assembly is prevented from dropping off the teat 17 at the end point of milking by the downwardly flexed fingers 15c of disk 15 even though the vacuum seal is broken between the liner 12 and the collapsed teat wall.

In the modified form of disk shown at 30 the upper edge portions 30b grip the collapsed teat wall to prevent dropoff at the end point of milking.

Figure 6:
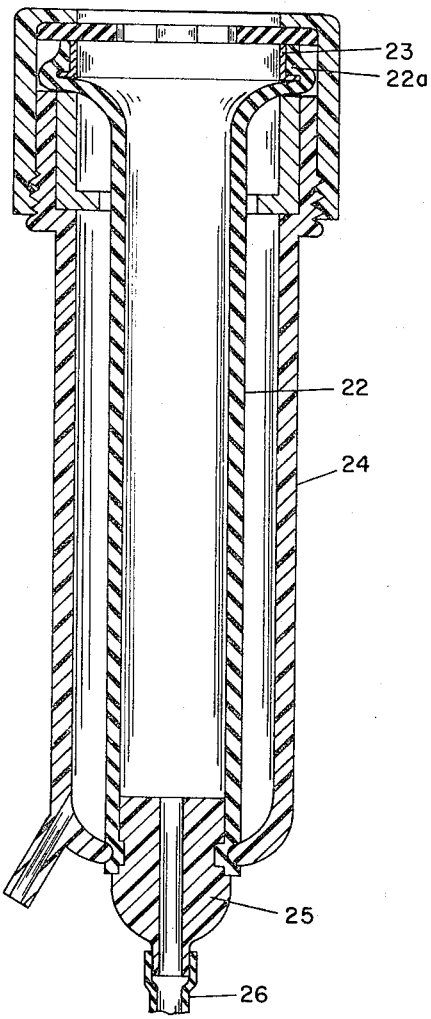
FIG. 6 is a cross-sectional view of a modified form of my teat cup assembly.

FIG. 6 shows a modified form of a liner 22 for my teat cup assembly 10. The liner 22 shown in FIG. 6 may be formed from a straight piece of rubber tubing. A substantially rigid flanged ring 23 is inserted into the top portion of the rubber tubing to provide an enlarged mouth portion 22a. The lower end of liner 22 extends through an aperture in shell 24 and is held in air-tight relation therewith by a plug 25 which is inserted into the lower end of liner 22. The plug 25 may be inserted into the vacuum milking line 26 of the milking machine. Liner 22 may be somewhat less expensive than the molded rubber liner 12 since it may be formed from a straight section of rubber tubing. The rest of the teat cup assembly shown in FIG. 6 is the same as teat cup assembly 10 shown in FIGS. 1–5 and the operation of the modified form of teat cup assembly shown in FIG. 6 is identical to that of teat cup assembly 10.

It is understood that my invention is not confined to the particular construction or arrangement of parts herein illustrated and described, but embraces all such modified forms thereof as may come within the scope of the following claims.

I claim:

1. A teat cup assembly for an automatic milking machine having a vacuum milk line and a pulsating vacuum line, said assembly comprising:

(a) a substantially rigid plastic shell having an upper head portion and a port adapted to be connected to the pulsating vacuum line of said milking machine, (b) a resilient liner positioned in said shell, said liner being adapted to receive the teat of a cow in the upper portion thereof and to have its lower end connected to the vacuum milk line of said milking machine, (c) a metal ring seated in the head portion of said shell for providing weight for the tensioning of said teat to facilitate milking, said metal ring having a fixed diameter opening therein through which said liner extends and being of such a size that the ring acts as a positive stop for limiting expansion of said liner and prevents the cow's teat from seating too deeply in said liner, (d) a removable cap secured to the head portion of said shell, and (e) a resilient disk positioned between said cap and said liner, said disk having a substantially centrally located aperture for receiving said teat and having means for admitting air into the top of said liner at the end point of milking and for grasping said teat to prevent said assembly from dropping off said teat.

2. A teat cup assembly for an automatic milking machine having a vacuum milk line and a pulsating vacuum line, said teat assembly comprising:
 (a) a substantially rigid plastic shell having an upper head portion and a port adapted to be connected to the pulsating vacuum line of said milking machine,
 (b) a resilient liner in said shell, said liner having an enlarged mouth portion and a tapered neck portion at its top end, said liner being adapted to receive the teat of a cow in the upper portion thereof and to be connected at its lower end to the vacuum milk line of said milking machine,
 (c) a helical metal spring encircling the neck portion of said liner for maintaining proper tension in said neck portion,
 (d) a metal ring seated in the head portion of said shell and encircling said liner in the area of said neck portion for providing weight for the tensioning of said teat to facilitate milking,
 (e) a removable cap secured to the head portion of of said shell, and
 (f) a resilient disk positioned between said cap and said liner, said disk having a substantially centrally located aperture for receiving said teat and having a plurality of upper edge portions defining a portion of said aperture for grasping said teat to prevent said assembly from dropping off of said teat, and a plurality of lower channel sections formed in the top of said disk between said upper edge portions and extending outwardly from said aperture, said upper edge portions maintaining said lower channel sections from said teat for admitting air to the top of said liner at the end point of milking.

3. An improvement in a teat cup assembly having a substantially rigid shell having a port adapted to be connected to the pulsating vacuum line of a milking machine, a resilient liner positioned in said shell for receiving the teat of a cow in the upper portion thereof and being adapted to have its lower end connected to the vacuum milk line of said milking machine, said improvement comprising:
 (a) a resilient disk adapted to be positioned in the top portion of said shell,
 (b) said disk having a substantially centrally located aperture defined by a continuous edge having alternating upper and lower portions for receiving the teat of a cow,
 (c) said upper edge portions engaging the wall of said teat to prevent said teat cup assembly from dropping off of said teat,
 (d) said disk having a plurality of lower channel sections formed in the top of said disk between said upper edge portions and extending outwardly from the lower edge portions of said central aperture, and
 (e) said teat engaging upper edge portions maintaining said lower edge portions from the teat wall for admitting air through said lower channel sections into the top of said liner at the end point of milking.

References Cited by the Examiner

UNITED STATES PATENTS

| 1,201,808 | 10/1916 | Dinesen | 119—14.49 |
| 1,260,466 | 3/1918 | Sharples | 119—14.52 |
| 3,096,740 | 7/1963 | Noorlander | 119—14.52 |
| 3,158,136 | 11/1964 | George | 119—14.52 |

FOREIGN PATENTS

| 157,470 | 7/1954 | Australia. |
| 644,168 | 10/1950 | Great Britain. |

SAMUEL KOREN, *Primary Examiner.*

HUGH R. CHAMBLEE, *Examiner.*